United States Patent
Jin et al.

(10) Patent No.: US 10,128,877 B2
(45) Date of Patent: Nov. 13, 2018

(54) NETWORK ASSISTED INTERFERENCE CANCELLATION AND SUPPRESSION, METHODS AND DEVICES FOR CONTROLLING THE SAME

(71) Applicant: China Mobile Communications Corporation, Beijing (CN)

(72) Inventors: Jing Jin, Beijing (CN); Hui Tong, Beijing (CN); Fei Wang, Beijing (CN); Qixing Wang, Beijing (CN); Zhenping Hu, Beijing (CN)

(73) Assignee: China Mobile Communications Corporation, Beijing (CN)

( * ) Notice: Subject to any disclaimer, the term of this patent is extended or adjusted under 35 U.S.C. 154(b) by 0 days.

(21) Appl. No.: 15/514,779

(22) PCT Filed: May 29, 2015

(86) PCT No.: PCT/CN2015/080381
§ 371 (c)(1),
(2) Date: Mar. 27, 2017

(87) PCT Pub. No.: WO2016/045404
PCT Pub. Date: Mar. 31, 2016

(65) Prior Publication Data
US 2017/0222671 A1    Aug. 3, 2017

(30) Foreign Application Priority Data
Sep. 26, 2014    (CN) .......................... 2014 1 0505308

(51) Int. Cl.
*H04B 1/10*    (2006.01)
*H04L 29/08*    (2006.01)
(Continued)

(52) U.S. Cl.
CPC .............. *H04B 1/10* (2013.01); *H04L 29/08* (2013.01); *H04W 8/24* (2013.01); *H04W 24/08* (2013.01);
(Continued)

(58) Field of Classification Search
CPC .......... H04B 1/10; H04W 8/24; H04W 24/08; H04W 24/10; H04W 72/082; H04W 72/085
(Continued)

(56) References Cited

U.S. PATENT DOCUMENTS

2013/0182690 A1*    7/2013    Kovacs ............. H04W 72/0426
                                                                370/336
2015/0372778 A1*    12/2015    Xu .......................... H04J 11/005
                                                                370/329
(Continued)

FOREIGN PATENT DOCUMENTS

CN    101795471 A    8/2010
CN    102238550        11/2011
(Continued)

OTHER PUBLICATIONS

NTT Docomo, "Views on Higher Layer Signaling for NAICS", 3GPP TSG RAN WG1 Meeting #76bis R1-141474 (Apr. 4, 2014).
(Continued)

*Primary Examiner* — Dong-Chang Shiue
(74) *Attorney, Agent, or Firm* — Mintz Levin Cohn Ferris Glovsky and Popeo, P.C.; Kongsik Kim; Carolina Säve (57) ABSTRACT

The disclosure discloses Network Assisted Interference Cancellation and Suppression (NAICS), methods and devices for controlling the same, which are configured to reduce processing complexity of User Equipment (UE) in NAICS under the condition of no excessive high-layer signalling overhead and no waste of a Carrier Aggregation
(Continued)

(CA) capability of the UE in a CA scenario. The method for NAICS includes that: the UE receives an Interference Cancellation (IC) indication message sent by a Node B, and the IC indication message includes an Identifier (ID) of a Component Carrier (CC) which is targeted when the UE performs NAICS. The CC is a CC which performs CA transmission on the UE; and the UE performs NAICS on the CC according to the IC indication message.

12 Claims, 5 Drawing Sheets

(51) Int. Cl.
  *H04W 8/24* (2009.01)
  *H04W 24/08* (2009.01)
  *H04W 24/10* (2009.01)
  *H04W 72/08* (2009.01)
(52) U.S. Cl.
  CPC ......... *H04W 24/10* (2013.01); *H04W 72/082* (2013.01); *H04W 72/085* (2013.01)
(58) Field of Classification Search
  USPC .......................................... 455/501, 507, 522
  See application file for complete search history.

(56) References Cited

U.S. PATENT DOCUMENTS

| | | | |
|---|---|---|---|
| 2015/0372779 A1* | 12/2015 | Lim ....................... | H04J 11/005 370/338 |
| 2017/0172035 P1* | 6/2017 | Tate | |
| 2017/0179985 A1* | 6/2017 | Kim ....................... | H04B 1/10 |
| 2017/0244434 A1* | 8/2017 | Sesia ................... | H04B 1/1027 |

FOREIGN PATENT DOCUMENTS

| | | |
|---|---|---|
| CN | 102869101 | 1/2013 |
| EP | 3145101 | 3/2017 |
| JP | 2016-540756 A | 12/2016 |
| JP | 2017-515352 A | 6/2017 |
| WO | 2015/174800 A1 | 11/2015 |
| WO | 2015195210 A2 | 12/2015 |
| WO | 2016/021713 A1 | 2/2016 |

OTHER PUBLICATIONS

International Search Report in International Application No. PCT/CN2015/080381, dated Sep. 2, 2015.
English Translation of the Written Opinion of the International Search Authority in International Application No. PCT/CN2015/080381, dated Sep. 2, 2015.
Nokia Networks et al., "On RRC Signalling for NAICS", 3GPP Draft; R2-143485 on RRC Signalling for NAICS, 3rd Generation Partnership Project (3GPP), Mobile Competence Centre; 650, Route Des Lucioles; F-06921 Sophia-Antipolis Cedex; France, [Online] vol. RAN WG2, No. Seoul,Korea; Aug. 18, 2014-Aug. 22, 2014, Aug. 17, 2014 (Aug. 17, 2014), XP050794494, Retrieved from the Internet: URL:http://www.3gpp.org/ftp/Meetings_3GPP-SYNC/RAN2/Docsi> [retrieved on Aug. 17, 2014].
3rd Generation Partnership Project: Technical Specification Group Radio Access Network; Study on Networt-Assisted Interference Cancellation and Suppression (NAIC) for LTE (Release 12), 3GPP Standard; 3GPP TR 36.886, 3rd Generation Partnership Project (3GPP), Mobile Competence Centre; 650, Route Des Lucioles; F-06921 Sophia-Antipolis Cedex; France, vol. RAN WGI, No. V12. 0.1, Mar. 28, 2014 (Mar. 28, 2014), pp. 1-64, XP051293311, (retrieved on Mar. 28, 2014).
Supplementary European Search Report in EP Application No. 15844374.7, dated Aug. 30, 2017.

* cited by examiner

NETWORK ASSISTED INTERFERENCE CANCELLATION AND SUPPRESSION, METHODS AND DEVICES FOR CONTROLLING THE SAME

CROSS-REFERENCE TO RELATED APPLICATIONS

This application is a U.S. national phase of International Application No. PCT/CN2015/080381, filed on May 29, 2015, which claims priority to Chinese Application No. 201410505308.1 filed on Sep. 26, 2014, which applications are incorporated herein by reference.

TECHNICAL FIELD

The disclosure relates to the technical field of communication, and more particularly to NAICS, methods and devices for controlling the same.

BACKGROUND

Along with rapid development of wireless communication technology, NAICS technology is proposed in 3rd Generation Partnership Project (3GPP) Release 12 (R12), and its principle is that User Equipment (UE) configures an advanced receiver, and combines Interference Cancellation (IC) information notified by a network side and its own blind detection to effectively cancel interference and improve receiving performance.

An advanced receiver includes linear Enhanced Linear Minimum Mean Square Error-Interference Rejection Combining (E-LMMSE-IRC), and nonlinear Symbol-level Interference Cancellation (SLIC), Maximum Likelihood (ML) or Reduced complexity ML (R-ML), Code word level SIC (CWIC) and the like. The E-LMMSE-IRC estimates an interference channel by virtue of an interference cell pilot configuration and precoding matrix obtained from a high layer, and further performs interference rejection combining to improve receiving performance; and a nonlinear receiver estimates and reconstructs an interference signal by virtue of interference related information, and deletes the interference signal from the received signal to greatly improve receiving performance.

In order to implement effective IC, IC information required to be acquired by UE is shown in Table 1 as follows.

TABLE 1

| IC information type | IC information name |
| --- | --- |
| Network configuration related | System bandwidth, synchronization indication |
| Cell-level and quasi-static | Cell Identifier (ID), Common Reference Signal (CRS) port, Multicast Broadcast Single Frequency Network (MBSFN) configuration, downlink power allocation parameter PB |
| UE-level and quasi-static | Downlink power allocation parameter PA, transmission mode, Channel State Indication Reference Signal (CSI-RS) configuration and Quasi Collocation (QCL) |
| Cell-level and dynamic | Control Format Indicator (CFI) |
| UE-level and dynamic | Modulation order, preceding codebook indication, rank indication, Demodulation Reference Signal (DMRS) port, resource allocation granularity and type, and DMRS Virtual Cell ID (VCID) |

At present, an acquisition manner for the IC information is being discussed by a 3GPP R12 standard: high-layer signalling notification or UE blind detection. The high-layer signalling notification manner may reduce complexity of blind detection and improve accuracy. However, for a user-level dynamic parameter, both timeliness and overhead of high-layer signalling notification are limited, and the blind detection manner is indispensable. According to five types of the IC information, the signalling design principle is that:

cell related and quasi-static IC information (an interference cell ID, a CRS port number, an MBSFN format and the like) with relatively lower signalling overhead is notified to UE by adopting high-layer signalling;

user-related dynamic IC information (a modulation order, a DMRS port number and the like) with acceptable blind detection complexity is acquired by virtue of UE blind detection; and complexity of user related dynamic IC information (such as PA, a DMRS VOID and the like) with high blind detection complexity may be reduced in a manner of setting a subset.

However, for a Carrier Aggregation (CA) scenario, if UE performs NAICS on all Component Carriers (CCs) for CA, a great challenge may be brought to processing complexity of the UE. In a conventional art, for a scenario combining CA and NAICS, there is yet no solution to how to reduce the processing complexity of the UE.

SUMMARY

Embodiments of the disclosure provide NAICS, methods and devices for controlling the same, which are configured to reduce processing complexity of UE in NAICS under the condition of no excessive high-layer signalling overhead and no waste of a CA capability of the UE in a CA scenario.

An embodiment of the disclosure provides a method for NAICS, which may include that:

UE receives an IC indication message sent by a Node B, and the IC indication message may include an ID of a CC which is targeted when the UE performs NAICS, and the CC may be a CC which performs CA transmission on the UE; and the UE performs NAICS on the CC according to the IC indication message.

According to the method, the UE performs NAICS on the CC according to the IC indication message sent by the Node B, and the IC indication message includes the ID of the CC which is targeted when the UE performs NAICS, so that the UE may perform NAICS on the targeted CC, and may not be required to perform NAICS on all CCs; and therefore, NAICS processing complexity of the UE may be reduced under the condition of no excessive high-layer signalling overhead and no waste of a CA capability of the UE in a CA scenario.

Preferably, before the step that the UE receives the IC indication message sent by the Node B, the method may further include that:

the UE reports a CC number which may be supported during NAICS to the Node B.

Preferably, before the step that the UE receives the IC indication message sent by the Node B, the method may further include that:

the UE receives an interference measurement notice sent by the Node B, performs interference measurement on each CC according to the interference measurement notice, selects a target CC according to a measurement result, and reports information of the target CC to the Node B.

The information of the target CC may only be an ID of the target CC, and may also include the ID and corresponding alternate priority of the target CC, and the alternate priority is configured to indicate the Node B to determine the ID, required to be carried in the sent IC indication message, of the CC.

When the UE determines the alternate priority of the target CC, the alternate priority may be determined according to the measurement result of interference measurement, and for example, the alternate priority of the target CC may be determined according to a sequence from strong to weak interference, an alternate priority of a CC subjected to highest interference strength is highest, and an alternate priority of a CC subjected to weakest interference is lowest.

Preferably, the operation that the target CC is selected according to the measurement result may include that:

a preset number of target CCs are selected according to a magnitude of a value of an interference parameter of a neighbouring cell, with highest interference strength, of each CC; or, a preset number of target CCs are selected according to a magnitude of a sum of values of interference parameters of all interference neighbouring cells of each CC; or, a preset number of target CCs are selected according to a magnitude of a sum of interference parameters of m interference neighbouring cells of each CC, and m may be a preset number of interference neighbouring cells which may be deleted by the UE for any CC.

Preferably, the interference parameter may be one or combination of the following parameters:

Reference Signal Received Power (RSRP), Reference Signal Received Quality (RSRQ) and a Received Signal Strength Indication (RSSI).

Preferably, the target CC may include a CC corresponding to a Primary Cell (Pcell).

Preferably, the information, reported by the UE, of the target CC may include the ID and alternate priority of the target CC.

Preferably, the method may further include that: the UE acquires IC information transmitted by the Node B for the CC corresponding to the ID, carried in the IC indication message, of the CC; and the step that the UE performs NAICS on the CC according to the IC indication message may include that:

the UE performs NAICS on the CC corresponding to the ID, carried in the IC indication message, of the CC according to the IC indication message, the IC information transmitted by the Node B and IC information obtained by blind detection of the UE for the CC corresponding to the ID, carried in the IC indication message, of the CC.

An embodiment of the disclosure provides a method for controlling NAICS, which may include that:

a Node B determines an ID of a CC which is targeted when UE performs NAICS, the CC being a CC which performs CA transmission on the UE; and the Node B sends an IC indication message to the UE, and the IC indication message may include the ID of the CC which is targeted when the UE performs NAICS.

According to the control method, the Node B sends the IC indication message to the UE, then the UE performs NAICS on the CC according to the IC indication message, and the IC indication message includes the ID of the CC which is targeted when the UE performs NAICS, so that the UE may pertinently perform NAICS on the CC, and may not be required to perform NAICS on all CCs; and therefore, NAICS processing complexity of the UE may be reduced under the condition of no excessive high-layer signalling overhead and no waste of a CA capability of the UE in a CA scenario.

Preferably, before the step that the Node B sends the IC indication message to the UE, the method may further include that:

the Node B receives a CC number which is reported by the UE and may be supported when the UE performs NAICS; and the step that the Node B determines the ID of the CC which is targeted when the UE performs NAICS may include that:

the Node B determines the ID of the CC which is targeted when the UE performs NAICS according to the CC number which is reported by the UE and may be supported when the UE performs NAICS.

Preferably, before the step that the Node B sends the IC indication message to the UE, the method may further include that:

the Node B sends an interference measurement notice to the UE according to its own maintained neighbouring cell list to indicate the UE to perform interference measurement on each CC according to the interference measurement notice;

the Node B receives information, reported by the UE, of a target CC, and the target CC may be selected according to a measurement result of interference measurement performed on each CC by the UE according to the interference measurement notice; and the step that the Node B determines the ID of the CC which is targeted when the UE performs NAICS may include that:

the Node B determines the ID of the CC which is targeted when the UE performs NAICS according to the information, reported by the UE, of the target CC.

Preferably, the ID, carried in the IC indication message, of the CC may include an ID of a CC corresponding to a Pcell.

Preferably, the information, reported by the UE, of the target CC may include an ID and alternate priority of the target CC; and the step that the Node B determines the ID of the CC which is targeted when the UE performs NAICS according to the information, reported by the UE, of the target CC may include that:

the Node B selects a CC according to the alternate priority, reported by the UE, of the target CC, and determines an ID corresponding to the selected CC as the ID of the CC which is targeted when the UE performs NAICS.

Preferably, the step that the Node B selects the CC according to the alternate priority, reported by the UE, of the target CC may include that:

the Node B selects a CC which is not deactivated by a Media Access Control (MAC) layer according to the alternate priority, reported by the UE, of the target CC.

An embodiment of the disclosure provides a device for NAICS, which may include:

a first unit, configured to receive an IC indication message sent by a Node B, and the IC indication message may include an ID of a CC which is targeted when UE performs NAICS, and the CC may be a CC which performs CA transmission on the UE; and a second unit, configured to perform NAICS on the CC according to the IC indication message.

Preferably, the first unit may further be configured to, before receiving the IC indication message sent by the Node B, report a CC number which may be supported during NAICS to the Node B.

Preferably, the first unit may further be configured to, before receiving the IC indication message sent by the Node B, receive an interference measurement notice sent by the Node B, perform interference measurement on each CC according to the interference measurement notice, select a target CC according to a measurement result, and report information of the target CC to the Node B.

Preferably, when selecting the target CC according to the measurement result, the first unit may specifically be configured to:

select a preset number of target CCs according to a magnitude of a value of an interference parameter of a neighbouring cell, with highest interference strength, of each CC; or, select a preset number of target CCs according to a magnitude of a sum of values of interference parameters of all interference neighbouring cells of each CC; or, select a preset number of target CCs according to a magnitude of a sum of interference parameters of m interference neighbouring cells of each CC, and m may be a preset number of interference neighbouring cells which may be deleted by the UE for any CC.

Preferably, the interference parameter may be one or combination of the following parameters:

RSRP, RSRQ and an RSSI.

Preferably, the target CC may include a CC corresponding to a Primary Cell (Pcell).

Preferably, the information of the target CC may include an ID and alternate priority of the target CC.

Preferably, the first unit may further be configured to acquire IC information transmitted by the Node B for the CC corresponding to the ID, carried in the IC indication message, of the CC; and the second unit may specifically be configured to: perform NAICS on the CC corresponding to the ID, carried in the IC indication message, of the CC according to the IC indication message, the IC information transmitted by the Node B and IC information obtained by blind detection of the UE for the CC corresponding to the ID, carried in the IC indication message, of the CC.

An embodiment of the disclosure provides a device for controlling NAICS, which may include:

a determination unit, configured to determine an ID of a CC which is targeted when UE performs NAICS, the CC being a CC which performs CA transmission on the UE; and an indication unit, configured to send an IC indication message to the UE, and the IC indication message may be the ID of the CC which is targeted when the UE performs NAICS.

Preferably, the determination unit may further be configured to: receive a CC number which is reported by the UE and may be supported when the UE performs NAICS; and when determining the ID of the CC which is targeted when the UE performs NAICS, the determination unit may specifically be configured to: determine the ID of the CC which is targeted when the UE performs NAICS according to the CC number which is reported by the UE and may be supported when the UE performs NAICS.

Preferably, the determination unit may further be configured to: send an interference measurement notice to the UE according to its own maintained neighbouring cell list to indicate the UE to perform interference measurement on each CC according to the interference measurement notice, and receive information, reported by the UE, of a target CC, and the target CC may be selected according to a measurement result of interference measurement performed on each CC by the UE according to the interference measurement notice; and when determining the ID of the CC which is targeted when the UE performs NAICS, the determination unit may specifically be configured to: determine the ID of the CC which is targeted when the UE performs NAICS according to the information, reported by the UE, of the target CC.

Preferably, the ID, carried in the IC indication message, of the CC may include an ID of a CC corresponding to a Pcell.

Preferably, the information, reported by the UE, of the target CC may include an ID and alternate priority of the target CC; and when determining the ID of the CC which is targeted when the UE performs NAICS according to the information, reported by the UE, of the target CC, the determination unit may specifically be configured to:

select a CC according to the alternate priority, reported by the UE, of the target CC, and determine an ID corresponding to the selected CC as the ID of the CC which is targeted when the UE performs NAICS.

Preferably, when selecting the CC according to the alternate priority, reported by the UE, of the target CC, the determination unit may specifically be configured to:

select a CC which is not deactivated by a MAC layer according to the alternate priority, reported by the UE, of the target CC.

DETAILED DESCRIPTION

Embodiments of the disclosure provide NAICS, methods and devices for controlling the same, which are configured to reduce processing complexity of UE in NAICS under the condition of no excessive high-layer signalling overhead and no waste of a CA capability of the UE in a CA scenario.

For a scenario combining CA and NAICS, there are, for example, two solutions easily to be thought of.

Solution 1: a network side transmits high-layer signalling required by NAICS to all CCs which may be supported by UE regardless of an NAICS capability of the UE, and the UE selects a corresponding CC for NAICS according to its own NAICS capability. That is, the network side is not required to know the CC on which NAICS is performed.

Here, the NAICS capability of the UE specifically refers to the number of CCs or bands which may be supported when the UE performs NAICS.

In the solution, the high-layer signalling is also transmitted to the CC on which NAICS may not be performed, so that high-layer signalling overhead may be wasted.

Solution 2: the network side configures a corresponding number of CCs for CA for the UE according to the NAICS capability of the UE.

In the solution, the number of CCs which provide CA transmission for the UE is limited, so that the CA capability of the UE is wasted.

A better technical solution provided by the embodiment of the disclosure will be described below with reference to the drawings.

Figure 1:
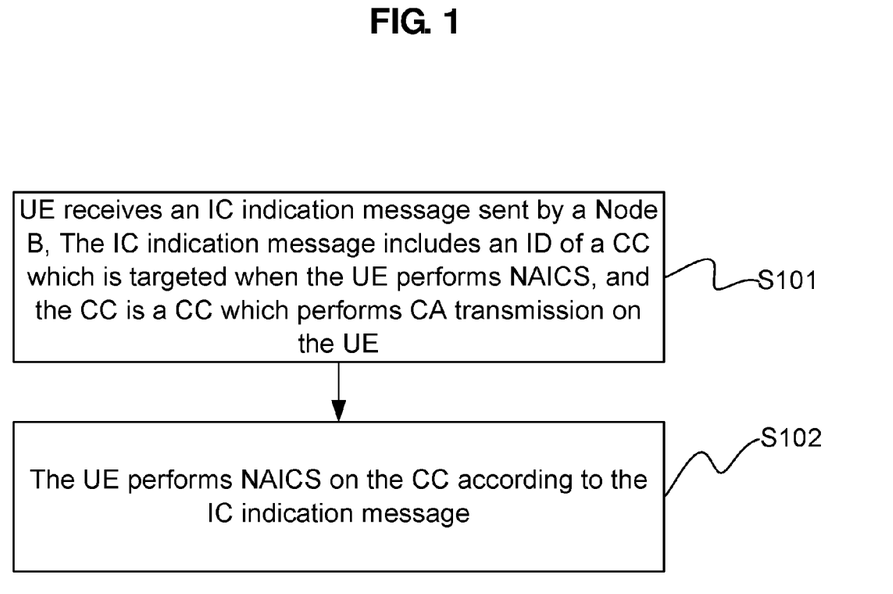
FIG. 1 is a flowchart of a method for NAICS on a UE side according to an embodiment of the disclosure.

Referring to FIG. 1, the embodiment of the disclosure provides a method for NAICS, which includes the following steps.

S101: UE receives an IC indication message sent by a Node B, and the IC indication message includes an ID of a CC which is targeted when the UE performs NAICS. The CC is a CC which performs CA transmission on the UE.

The IC indication message includes the ID of the CC which is targeted when the UE performs NAICS, so that the UE may perform NAICS on the targeted CC, and may not be required to perform NAICS on all CCs.

The Node B may be an Evolved Node b (eNB).

S102: the UE performs NAICS on the CC according to the IC indication message.

According to the method, the UE performs NAICS on the CC according to the IC indication message sent by the Node B, so that, compared with the above mentioned solution 1 and solution 2, the technical solution has the advantage that NAICS processing complexity of the UE may be reduced under the condition of no excessive high-layer signalling overhead and no waste of a CA capability of the UE in a CA scenario.

Preferably, before the step that the UE receives the IC indication message sent by the Node B, the method further includes that:

the UE reports a CC number which may be supported during NAICS to the Node B, that is, the UE reports its own NAICS capability to the Node B, and if the Node B has known the NAICS capability of the UE in advance, the UE is not required to report it.

Preferably, before the step that the UE receives the IC indication message sent by the Node B, the method further includes that:

the UE receives an interference measurement notice sent by the Node B, performs interference measurement on each CC according to the interference measurement notice, selects a target CC according to a measurement result, and reports information of the target CC to the Node B, that is, the UE may report one or more CCs selected according to measurement by itself to the Node B for reference, so that the Node B may select a CC from the CCs reported by the UE and indicate the UE to perform NAICS on the selected CC.

Preferably, the operation that the target CC is selected according to the measurement result includes that:

a preset number of target CCs are selected according to a magnitude of a value of an interference parameter of a neighbouring cell, with highest interference strength, of each CC; or, a preset number of target CCs are selected according to a magnitude of a sum of values of interference parameters of all interference neighbouring cells of each CC; or, a preset number of target CCs are selected according to a magnitude of a sum of interference parameters of m interference neighbouring cells of each CC, and here m is a preset number of interference neighbouring cells which may be deleted by the UE for any CC.

For example, the UE may report IDs of M CCs with highest interference strength in the abovementioned three manners.

Preferably, the interference parameter is one or combination of the following parameters:

RSRP, RSRQ and an RSSI.

Considering importance of a Pcell, preferably, the target CC includes a CC corresponding to the Pcell.

Preferably, the method further includes that: the UE acquires IC information transmitted by the Node B for the CC corresponding to the ID, carried in the IC indication message, of the CC, here the IC information transmitted by the Node B for the CC corresponding to the ID carried in the IC indication message, of the CC may be carried in the IC indication message sent by the Node B, and may also be sent independently by the Node B.

Then, the step that the UE performs NAICS on the CC according to the IC indication message includes that:

the UE performs NAICS on the CC corresponding to the ID, carried in the IC indication message, of the CC according to the IC indication message, the IC information transmitted by the Node B and IC information obtained by blind detection of the UE for the CC corresponding to the ID, carried in the IC indication message, of the CC.

Figure 2:
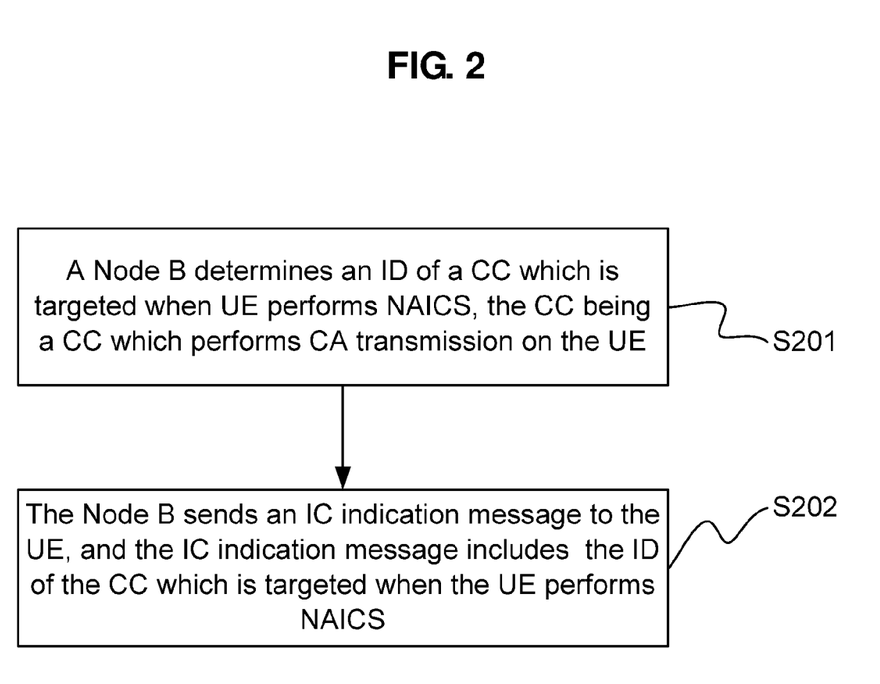
FIG. 2 is a flowchart of a method for controlling NAICS on a network side according to an embodiment of the disclosure.

Correspondingly, on a network side, referring to FIG. 2, the embodiment of the disclosure provides a method for controlling NAICS, which includes the following steps.

S201: a Node B determines an ID of a CC which is targeted when UE performs NAICS, the CC being a CC which performs CA transmission on the UE.

The Node B may be an eNB.

S202: the Node B sends an IC indication message to the UE, and the IC indication message includes the ID of the CC which is targeted when the UE performs NAICS.

According to the control method, the Node B sends the IC indication message to the UE, then the UE performs NAICS on the CC according to the IC indication message, and the IC indication message includes the ID of the CC which is targeted when the UE performs NAICS, so that the UE may perform NAICS on the targeted CC, and may not be required to perform NAICS on all CCs; and therefore, NAICS processing complexity of the UE may be reduced under the condition of no excessive high-layer signalling overhead and no waste of a CA capability of the UE in a CA scenario.

Preferably, before the step that the Node B sends the IC indication message to the UE, the method further includes that:

the Node B receives a CC number which is reported by the UE and may be supported when the UE performs NAICS; and the step that the Node B determines the ID of the CC which is targeted when the UE performs NAICS includes that:

the Node B determines the ID of the CC which is targeted when the UE performs NAICS according to the CC number which is reported by the UE and may be supported when the UE performs NAICS.

That is, the Node B is required to determine the ID of the CC which is targeted when the UE performs NAICS according to an NAICS capability of the UE, and the NAICS capability of the UE may be determined by negotiation between the network side and a UE side in advance, and may also be subsequently reported to the Node B by the UE, and if the NAICS capability of the UE is updated, an updated NAICS capability may also be reported to the Node B by the UE.

Preferably, before the step that the Node B sends the IC indication message to the UE, the method further includes that:

the Node B sends an interference measurement notice to the UE according to its own maintained neighbouring cell list to indicate the UE to perform interference measurement on each CC according to the interference measurement notice (the step may specifically be realized according to the conventional art);

the Node B receives information, reported by the UE, of a target CC, and the target CC is selected according to a measurement result of interference measurement performed on each CC by the UE according to the interference measurement notice; and the step that the Node B determines the ID of the CC which is targeted when the UE performs NAICS includes that:

the Node B determines the ID of the CC which is targeted when the UE performs NAICS according to the information, reported by the UE, of the target CC.

The step that the Node B sends the interference measurement notice to the UE according to its own maintained neighbouring cell list will be introduced as follows.

Triggering of Measurement Starting:

one manner is triggering: the Node B configures a measurement threshold for the UE, and if a condition is met, sends the interference measurement notice to the UE according to its own maintained neighbouring cell list; and another manner is periodic triggering, that is, the interference measurement notice is sent based on a preset period to the UE according to its own maintained neighbouring cell list.

Measurement information in the interference measurement notice sent to the UE by the Node B according to its own maintained neighbouring cell includes: frequency point measured, the neighbouring cell list and the like.

The UE is required to perform an operation such as pilot signal strength value measurement and the like over a neighbouring cell according to the notice.

Preferably, the ID, carried in the IC indication message, of the CC includes an ID of a CC corresponding to a Pcell.

Preferably, the information, reported by the UE, of the target CC includes an ID and alternate priority of the target CC; and the step that the Node B determines the ID of the CC which is targeted when the UE performs NAICS according to the information, reported by the UE, of the target CC includes that:

the Node B selects a CC according to the alternate priority, reported by the UE, of the target CC, and determines an ID corresponding to the selected CC as the ID of the CC which is targeted when the UE performs NAICS.

For example, the UE may report a list about the target CCs to the Node B, and the list includes a corresponding relationship between the IDs and alternate priorities of the target CCs. The IDs of the target CCs in the list may be arranged according to a sequence from high to low alternate priorities to facilitate selection of the Node B, and when selecting a CC, the Node B directly performs selection according to the sequence from high to low alternate priorities.

Preferably, the step that the Node B selects the CC according to the alternate priority, reported by the UE, of the target CC includes that:

the Node B selects a CC which is not deactivated by a MAC layer according to the alternate priority, reported by the UE, of the target CC, that is, for the condition that a certain CC in the target CC reported by the UE is deactivated by the MAC layer, the Node B may select a next CC with a relatively lower alternate priority as the CC which is targeted when the UE performs NAICS.

A specific embodiment will be described below.

Figure 3:
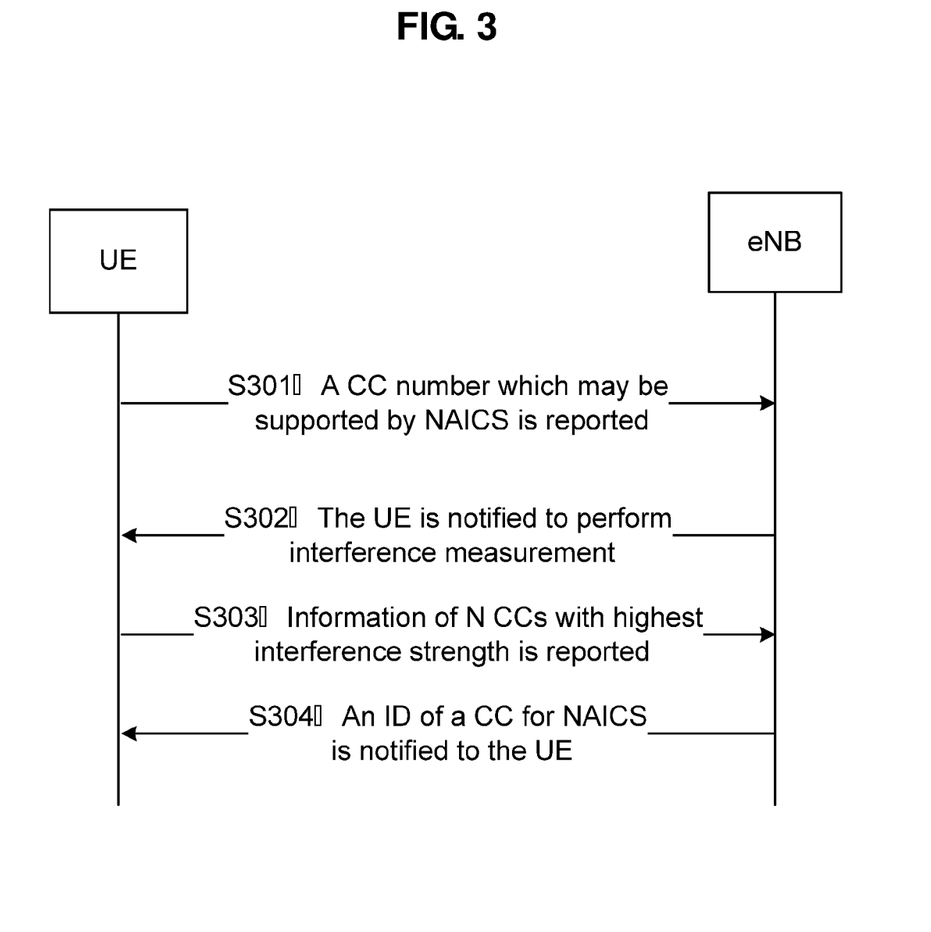
FIG. 3 is a flowchart of implementing NAICS by both a UE side and a network side according to an embodiment of the disclosure.

Referring to FIG. 3, the embodiment of the disclosure provides a flow for implementing NAICS, which includes the following steps.

S301: UE reports a CC number N which may be supported during NAICS.

N is less than or equal to a CC number, which may be supported by the UE, for CA.

If N has a default value between the UE and a network side, Step S301 may be neglected.

S302: an eNB notifies the UE to perform corresponding interference measurement according to a maintained neighbouring cell list.

S303: the UE reports IDs of M CCs with highest interference strength.

For multiple CCs, interference strength judgment may be performed in one of the following manners:

magnitudes of RSRP/RSRQ/RSSIs of neighbouring cells with highest interference strength are compared;

or, magnitudes of sums of RSRP/RSRQ/RSSIs of all interference neighbouring cells in the neighbouring cell list are compared;

or, sums of RSRP/RSRQ/RSSIs of m interference cells with highest interference strength are compared according to a number m of interference neighbouring cells which may be deleted by the UE.

Considering importance of a Pcell, besides the CCs selected according to an interference strength judgment result, a primary carrier corresponding to the Pcell is also reported.

Or, selection may also be performed directly from interference strength, and if interference on the Pcell is relatively weaker, the primary carrier corresponding to the Pcell may also not be reported.

Here, M>=N, interference strengths of the M CCs may be sequenced, and a sequencing result is reported.

S304: the eNB notifies an ID of a CC for NAICS to the UE according to the IDs, reported by the UE, of the M CCs.

Considering the importance of the Pcell, a notified content at least includes the Pcell.

Or, the ID of the CC for NAICS may also be selected only from the IDs, reported by the UE, of the M CCs.

For the condition that the UE reports the sequencing result of the M CCs, if a certain CC is deactivated by a MAC layer, a next CC may be sequentially selected for NAICS from the sequencing result.

Finally, the eNB notifies IC information corresponding to the CC for NAICS to the UE, and moreover, the UE performs IC information blind detection for the CC for NAICS. The UE performs NAICS on the CC corresponding to the ID, notified by the eNB, of the CC by combining the IC information notified by the eNB and IC information acquired by its own blind detection.

Figure 4:
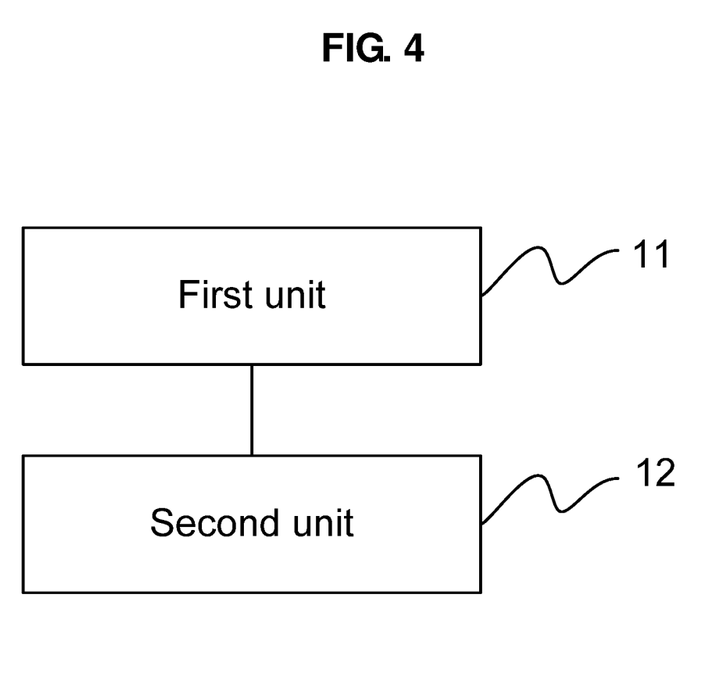
FIG. 4 is a structure diagram of a device for NAICS on a UE side according to an embodiment of the disclosure.

Referring to FIG. 4, on a UE side, the embodiment of the disclosure provides a device for NAICS, which includes:

a first unit 11, configured to receive an IC indication message sent by a Node B. The IC indication message includes an ID of a CC which is targeted when UE performs NAICS. The CC is a CC which performs CA transmission on the UE; and a second unit 12, configured to perform NAICS on the CC according to the IC indication message.

Preferably, the first unit is further configured to, before receiving the IC indication message sent by the Node B, report a CC number which may be supported during NAICS to the Node B.

Preferably, the first unit is further configured to, before receiving the IC indication message sent by the Node B, receive an interference measurement notice sent by the Node B, perform interference measurement on each CC according to the interference measurement notice, select a target CC according to a measurement result, and report information of the target CC to the Node B.

Preferably, when selecting the target CC according to the measurement result, the first unit is specifically configured to:

select a preset number of target CCs according to a magnitude of a value of an interference parameter of a neighbouring cell, with highest interference strength, of each CC; or, select a preset number of target CCs according to a magnitude of a sum of values of interference parameters of all interference neighbouring cells of each CC; or, select a preset number of target CCs according to a magnitude of a sum of interference parameters of m interference neighbouring cells of each CC, and m is a preset number of interference neighbouring cells which may be deleted by the UE for any CC.

Preferably, the interference parameter is one or combination of the following parameters:

RSRP, RSRQ and an RSSI.

Preferably, the target CC includes a CC corresponding to a Pcell.

Preferably, the first unit is further configured to acquire IC information transmitted by the Node B for the CC corresponding to the ID, carried in the IC indication message, of the CC; and the second unit is specifically configured to: perform NAICS on the CC corresponding to the ID, carried in the IC indication message, of the CC according to the IC indication message, the IC information transmitted by the Node B and IC information obtained by blind detection of the UE for the CC corresponding to the ID, carried in the IC indication message, of the CC.

Preferably, the first unit and the second unit may be implemented by a processor with a transceiver function.

Preferably, the device for NAICS may be UE.

Figure 5:
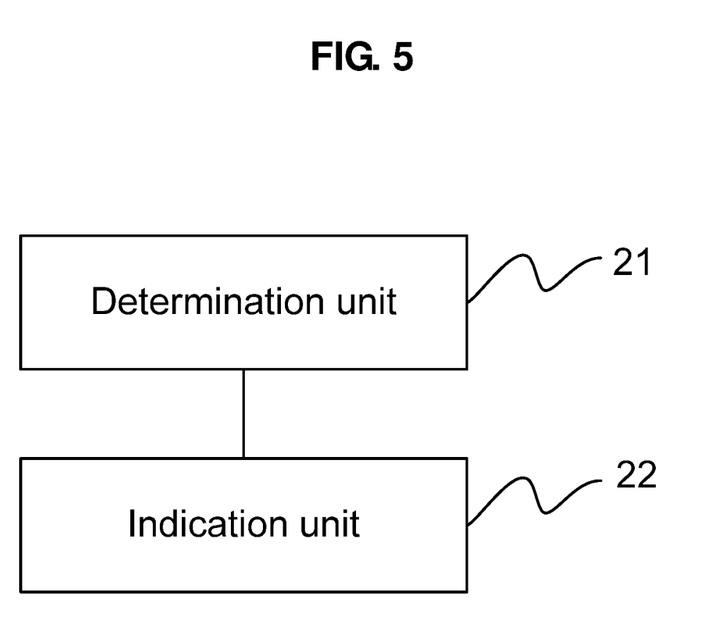
FIG. 5 is a structure diagram of a device for controlling NAICS on a network side according to an embodiment of the disclosure.

Referring to FIG. 5, on a network side, the embodiment of the disclosure provides a device for controlling NAICS, which includes:

a determination unit 21, configured to determine an ID of a CC which is targeted when UE performs NAICS, the CC being a CC which performs CA transmission on the UE; and an indication unit 22, configured to send an IC indication message to the UE, and the indication message includes the ID of the CC which is targeted when the UE performs NAICS.

Preferably, the determination unit is further configured to: receive a CC number which is reported by the UE and may be supported when the UE performs NAICS; and when determining the ID of the CC which is targeted when the UE performs NAICS, the determination unit is specifically configured to: determine the ID of the CC which is targeted when the UE performs NAICS according to the CC number which is reported by the UE and may be supported when the UE performs NAICS.

Preferably, the determination unit is further configured to: send an interference measurement notice to the UE according to its own maintained neighbouring cell list to indicate the UE to perform interference measurement on each CC according to the interference measurement notice, and receive information, reported by the UE, of a target CC, and the target CC is selected according to a measurement result of interference measurement performed on each CC by the UE according to the interference measurement notice; and when determining the ID of the CC which is targeted when the UE performs NAICS, the determination unit is specifically configured to: determine the ID of the CC which is targeted when the UE performs NAICS according to the information, reported by the UE, of the target CC.

Preferably, the ID, carried in the IC indication message, of the CC includes an ID of a CC corresponding to a Pcell.

Preferably, the information, reported by the UE, of the target CC includes an ID and alternate priority of the target CC; and when determining the ID of the CC which is targeted when the UE performs NAICS according to the information, reported by the UE, of the target CC, the determination unit is specifically configured to:

select a CC according to the alternate priority, reported by the UE, of the target CC, and determine an ID corresponding to the selected CC as the ID of the CC which is targeted when the UE performs NAICS.

Preferably, when selecting the CC according to the alternate priority, reported by the UE, of the target CC, the determination unit is specifically configured to:

select a CC which is not deactivated by a MAC layer according to the alternate priority, reported by the UE, of the target CC.

Preferably, the determination unit and the indication unit may be implemented by a processor with a transceiver function.

Preferably, the device for controlling NAICS may be a Node B, for example, an eNB.

Those skilled in the art should know that the embodiments of the disclosure may be provided as a method, a system or a computer program product. Therefore, the disclosure may adopt a form of pure hardware embodiment, pure software embodiment and combined software and hardware embodiment. Moreover, the disclosure may adopt a form of computer program product implemented on one or more computer-available storage media (including, but not limited to, a disk memory and an optical memory) including computer-available program codes.

The disclosure is described with reference to flowcharts and/or block diagrams of the method, device (system) and computer program product according to the embodiments of the disclosure. It should be understood that each flow and/or block in the flowcharts and/or the block diagrams and combinations of the flows and/or blocks in the flowcharts and/or the block diagrams may be implemented by computer program instructions. These computer program instructions may be provided for a universal computer, a dedicated computer, an embedded processor or a processor of other programmable data processing apparatus to generate a machine, so that a device for realizing a function specified in one flow or more flows in the flowcharts and/or one block or more blocks in the block diagrams is generated by the instructions executed through the computer or the processor of the other programmable data processing equipment.

These computer program instructions may also be stored in a computer-readable memory capable of guiding the computer or the other programmable data processing equipment to work in a specific manner, so that a product including an instruction device may be generated by the instructions stored in the computer-readable memory, the instruction device realizing the function specified in one flow or many flows in the flowcharts and/or one block or many blocks in the block diagrams.

These computer program instructions may further be loaded onto the computer or the other programmable data processing equipment, so that a series of operating steps are executed on the computer or the other programmable data processing equipment to generate processing implemented by the computer, and steps for realizing the function specified in one flow or many flows in the flowcharts and/or one block or many blocks in the block diagrams are provided by the instructions executed on the computer or the other programmable data processing equipment.

Obviously, those skilled in the art may make various modifications and transformations to the disclosure without departing from the spirit and scope of the embodiments of the disclosure. Therefore, if these modifications and transformations of the disclosure fall within the scope of the claims of the disclosure and its equivalent technology, the disclosure is also intended to include these modifications and transformations.

The invention claimed is:

1. A method for Network Assisted Interference Cancellation and Suppression (NAICS), comprising:
   reporting, by the UE, a Component Carrier (CC) number which is supported during NAICS to a Node B;
   receiving, by User Equipment (UE), an Interference Cancellation (IC) indication message sent by the Node B, wherein IC indication message includes an Identifier (ID) of CC which is targeted when the UE performs NAICS, and the CC is a CC which performs Carrier Aggregation (CA) transmission on the UE; and
   performing, by the UE, NAICS on the CC according to the IC indication message.

2. The method according to claim 1, before receiving, by the UE, the IC indication message sent by the Node B, the method further comprising:
   receiving, by the UE, an interference measurement notice sent by the Node B, performing interference measurement on each CC according to the interference measurement notice, selecting a target CC according to a measurement result, and reporting information of the target CC to the Node B.

3. The method according to claim 2, wherein selecting the target CC according to the measurement result comprises:
   selecting a preset number of target CCs according to a magnitude of a value of an interference parameter of a neighbouring cell, with highest interference strength, of each CC; or,
   selecting a preset number of target CCs according to a magnitude of a sum of values of interference parameters of all interference neighbouring cells of each CC; or,
   selecting a preset number of target CCs according to a magnitude of a sum of interference parameters of m interference neighbouring cells of each CC, wherein m is a preset number of interference neighbouring cells which is deleted by the UE for any CC.

4. The method according to claim 3, wherein the interference parameter is one or combination of the following parameters:
   Reference Signal Received Power (RSRP), Reference Signal Received Quality (RSRQ) and a Received Signal Strength Indication (RSSI).

5. The method according to claim 1, further comprising:
   acquiring, by the UE, IC information transmitted by the Node B for the CC corresponding to the ID, carried in the IC indication message, of the CC, wherein
   performing, by the UE, NAICS on the CC according to the IC indication message comprises:
   performing, by the UE, NAICS on the CC corresponding to the ID, carried in the IC indication message, of the CC according to the IC indication message, the IC information transmitted by the Node B and IC information obtained by blind detection of the UE for the CC corresponding to the ID, carried in the IC indication message, of the CC.

6. A method for controlling Network Assisted Interference Cancellation and Suppression (NAICS), comprising:
   determining, by a Node B, an Identifier (ID) of a Component Carrier (CC) which is targeted when User Equipment (UE) performs NAICS, the CC being a CC which performs Carrier Aggregation (CA) transmission on the UE; and
   receiving, by the Node B, a CC number which is reported by the UE and is supported when the UE performs NAICS, wherein
   determining, by the Node B, the ID of the CC which is targeted when the UE performs NAICS comprises:
   determining, by the Node B, the ID of the CC which is targeted when the UE performs NAICS according to the CC number which is reported by the UE and is supported when the UE performs NAICS;
   sending, by the Node B, an Interference Cancellation (IC) indication message to the UE, wherein the IC indication message includes the ID of the CC which is targeted when the UE performs NAICS.

7. The method according to claim 6, before sending, by the Node B, the IC indication message to the UE, the method further comprising:
   sending, by the Node B, an interference measurement notice to the UE according to its own maintained neighbouring cell list to indicate the UE to perform interference measurement on each CC according to the interference measurement notice; and
   receiving, by the Node B, information, reported by the UE, of a target CC, wherein the target CC is selected according to a measurement result of interference measurement performed on each CC by the UE according to the interference measurement notice, wherein
   determining, by the Node B, the ID of the CC which is targeted when the UE performs NAICS comprises:
   determining, by the Node B, the ID of the CC which is targeted when the UE performs NAICS according to the information, reported by the UE, of the target CC.

8. A device for Network Assisted Interference Cancellation and Suppression (NAICS), wherein the device is operated in User Equipment (UE) and comprises: a non-transitory storage medium storing computer-executable instructions; and one or more processors executing the computer-executable instructions to implement a plurality of program units, wherein the plurality of program units comprises:
   a first unit, configured to report a Component Carrier (CC) number which is supported during NAICS to a Node B; and receive an Interference Cancellation (IC) indication message sent by the Node B, wherein the IC indication message includes an Identifier (ID) of CC which is targeted when the User Equipment (UE) performs NAICS, and the CC is a CC which performs Carrier Aggregation (CA) transmission on the UE; and
   a second unit, configured to perform NAICS on the CC according to the IC indication message.

9. The device according to claim 8, wherein the first unit is further configured to, before receiving the IC indication message sent by the Node B, receive an interference measurement notice sent by the Node B, perform interference measurement on each CC according to the interference measurement notice, select a target CC according to a measurement result, and report information of the target CC to the Node B.

10. The device according to claim 8, wherein the first unit is further configured to acquire IC information transmitted by the Node B for the CC corresponding to the ID, carried in the IC indication message, of the CC; and the second unit is specifically configured to: perform NAICS on the CC corresponding to the ID, carried in the IC indication message, of the CC according to the IC indication message, the IC information transmitted by the Node B and IC information obtained by blind detection of the UE for the CC corresponding to the ID, carried in the IC indication message, of the CC.

11. A device for controlling Network Assisted Interference Cancellation and Suppression (NAICS), wherein the device is operated in Node B and comprises: a non-transitory storage medium storing computer-executable instructions; and one or more processors executing the computer-executable instructions to implement a plurality of program units, wherein the plurality of program units comprises:

a determination unit, configured to determine an Identifier (ID) of a Component Carrier (CC) which is targeted when User Equipment (UE) performs NAICS, the CC being a CC which performs Carrier Aggregation (CA) transmission on the UE; and receive a CC number which is reported by the UE and is supported when the UE performs NAICS;

wherein when determining the ID of the CC which is targeted when the UE performs NAICS, the processor is specifically configured to: determine the ID of the CC which is targeted when the UE performs NAICS according to the CC number which is reported by the UE and is supported when the UE performs NAICS; and an indication unit, configured to send an IC indication message to the UE, wherein the IC indication message includes the ID of the CC which is targeted when the UE performs NAIC.

12. The device according to claim 11, wherein the determination unit is further configured to: send an interference measurement notice to the UE according to its own maintained neighbouring cell list to indicate the UE to perform interference measurement on each CC according to the interference measurement notice, and receive information, reported by the UE, of a target CC, wherein the target CC is selected according to a measurement result of interference measurement performed on each CC by the UE according to the interference measurement notice; and when determining the ID of the CC which is targeted when the UE performs NAICS, the determination unit is specifically configured to: determine the ID of the CC which is targeted when the UE performs NAICS according to the information, reported by the UE, of the target CC.

* * * * *